(12) United States Patent
Vankamamidi et al.

(10) Patent No.: US 10,402,091 B1
(45) Date of Patent: Sep. 3, 2019

(54) MANAGING DATA IN LOG-STRUCTURED STORAGE SYSTEMS

(71) Applicant: EMC IP Holding Company LLC, Hopkinton, MA (US)

(72) Inventors: Vamsi K. Vankamamidi, Hopkinton, MA (US); Daniel E. Cummins, Hudson, NH (US); Steven A. Morley, Mendon, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/966,464

(22) Filed: Apr. 30, 2018

(51) Int. Cl.
*G06F 12/00* (2006.01)
*G06F 3/06* (2006.01)
*G06F 12/02* (2006.01)
*G06N 20/00* (2019.01)
*G06F 16/13* (2019.01)
*G06F 16/172* (2019.01)

(52) U.S. Cl.
CPC .......... *G06F 3/0604* (2013.01); *G06F 3/0643* (2013.01); *G06F 12/0253* (2013.01); *G06F 16/13* (2019.01); *G06F 16/172* (2019.01); *G06N 20/00* (2019.01)

(58) Field of Classification Search
None
See application file for complete search history.

(56) References Cited

U.S. PATENT DOCUMENTS

| | | |
|---|---|---|
| 8,479,302 B1 | 7/2013 | Lin |
| 8,655,823 B1 | 2/2014 | Manish |
| 9,727,479 B1 | 8/2017 | Armangau |
| 9,778,881 B2 | 10/2017 | Romanovskiy |
| 9,785,366 B1 | 10/2017 | Morley |
| 9,880,743 B1 | 1/2018 | Armangau |
| 9,959,054 B1 | 5/2018 | Vankamamidi |

(Continued)

OTHER PUBLICATIONS

Dalmatov, "Best-Effort Deduplication of Data While the Data Resides in a Front-End Log Along an I/O Path That Leads to Back-End Storage," International Patent Application No. PCTRU2017000274, filed Apr. 27, 2017.

(Continued)

*Primary Examiner* — John A Lane
(74) *Attorney, Agent, or Firm* — BainwoodHuang

(57) ABSTRACT

A first cache stores descriptors of very hot (i.e., recently-written) segments, while an overflow second cache stores descriptors of less-hot segments (i.e., those updated somewhat recently but not updated again in some time). When this second cache becomes full, the information contained within the second cache may be converted into a set of index structures that identifies the LESS-hot segments. These index structures may either be stored in a space-efficient manner or they may be stored in persistent storage rather than in memory. These index structures may build up over time. The oldest of these index structures represent the segments which have been updated the least recently, and are therefore the coldest. In some examples, a garbage collection process may be run first on the segments that are identified by the coldest index structures. The index structures can be further arranged into utilization ranges, so that low utilization segments may be further prioritized for garbage collection.

16 Claims, 7 Drawing Sheets

(56) References Cited

U.S. PATENT DOCUMENTS

| | | | | |
|---|---|---|---|---|
| 2002/0103965 A1* | 8/2002 | Dawkins | ............... | G06F 12/122 711/113 |
| 2002/0103975 A1* | 8/2002 | Dawkins | ............... | G06F 12/122 711/133 |
| 2004/0034750 A1* | 2/2004 | Horn | ................... | G06F 12/0866 711/156 |
| 2018/0102938 A1* | 4/2018 | Yoon | ........................ | G06F 9/546 |
| 2019/0042427 A1* | 2/2019 | Raz | ..................... | G06F 12/0815 |

OTHER PUBLICATIONS

Dalmatov, "Consolidating Temporally-Related Data Within Log-Based Storage," International Patent Application No. PCTRU2017000275, filed Apr. 27, 2017.

T. Kraska, et al., "The Case for Learned Index Structures," arXiv:1712.01208v2 [cs.DB], Dec. 11, 2017, 27 pages, Cornell University Library, retrieved from <https://arxiv.org/pdf/1712.01208> on Mar. 27, 2018.

S. M. Rumble, et al., "Log-structured Memory for DRAM-based Storage," 12 USENIX Conference on File and Storage Technologies FAST '14, Feb. 2014, 17 pages, USENIX Association, retrieved from <https://www.usenix.org/system/files/conference/fast14/fast14-paper_rumble.pdf> on Mar. 27, 2018.

M. Rosenblum, et al., "The Design and Implementation of a Log-Structured File System," ACM Transactions on Computer Systems, Feb. 1992, pp. 26-52, vol. 10, No. 1, Association for Computing Machinery.

Itzik Reich, "DellEMC XtremIO X2—Part 2, The Hardware & Improved Data Reduction," Itzikr's Blog, May 8, 2017, retrieved from <https://xtremio.me/2017/05/08/dellemc-xtremio-x2-part-2-the-hardware-improved-data-reduction/> on Apr. 20, 2018.

EMC, "Introduction to the EMC XtremIO Storage Array (Ver. 4.0): A Detailed Review," Apr. 2015, 65 pages, retrieved from <https://www.emc.com/collateral/white-papers/h11752-intro-to-XtremIO-array-wp.pdf> on Apr. 20, 2018.

EMC, "EMC XtremIO 4.0 System Specifications," Jun. 2015, 4 pages, USA, retrieved from <https://www.emc.com/collateral/data-sheet/h12451-xtremio-4-system-specifications-ss.pdf> on Apr. 20, 2018.

Dell EMC, "XtremIO X2 Specifications," 2017, 4 pages, retrieved from <https://www.dellemc.com/resources/en-us/asset/data-sheets/products/storage-2/h16094-xtremio-x2-specification-sheet-ss.pdf> on Apr. 20, 2018.

Dell EMC, "Dell EMC XtremIO X2: Next-Generation All-Flash Array," 2017, 5 pages, retrieved from <https://www.emc.com/collateral/data-sheet/h16095-xtremio-x2-next-generation-all-flash-array-ds.pdf> on Apr. 20, 2018.

Dell EMC, "Introduction to Dell EMC XtremIO X2 Storage Array: A Detailed Review," Aug. 2017, 46 pages, retrieved from <https://www.emc.com/collateral/data-sheet/h16444-introduction-xtremio-x2-storage-array-/wp.pdf> on Apr. 20, 2018.

Wils, et al., "Systems and Methods of Amoritizing Deletion Processing of a Log Structured Storage Based Volume Virtualization," U.S. Appl. No. 15/664,852, filed Jul. 31, 2017.

Armangau, et al., "Content-Based Caching Using Digests," U.S. Appl. No. 15/668,307, filed Aug. 3, 2017.

Dalmatov, et al., "Handling Data That Has Become Inactive Within Stream Aware Data Storage Equipment," U.S. Appl. No. 15/662,669, filed Jul. 28, 2017.

* cited by examiner

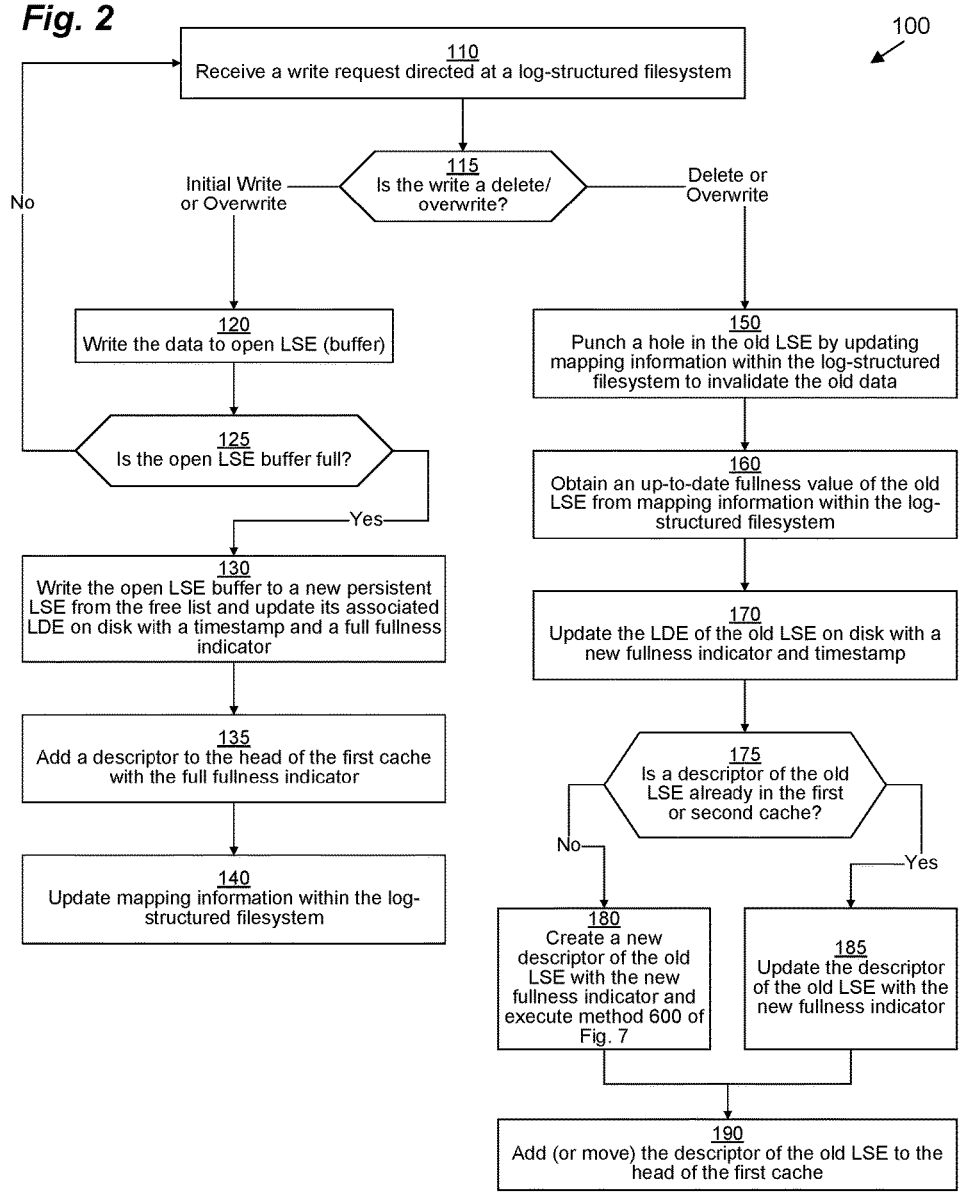

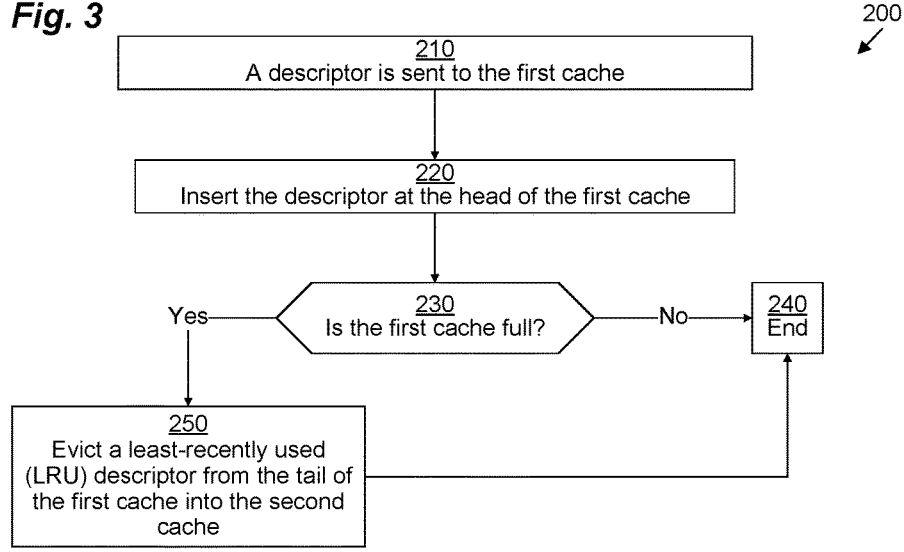
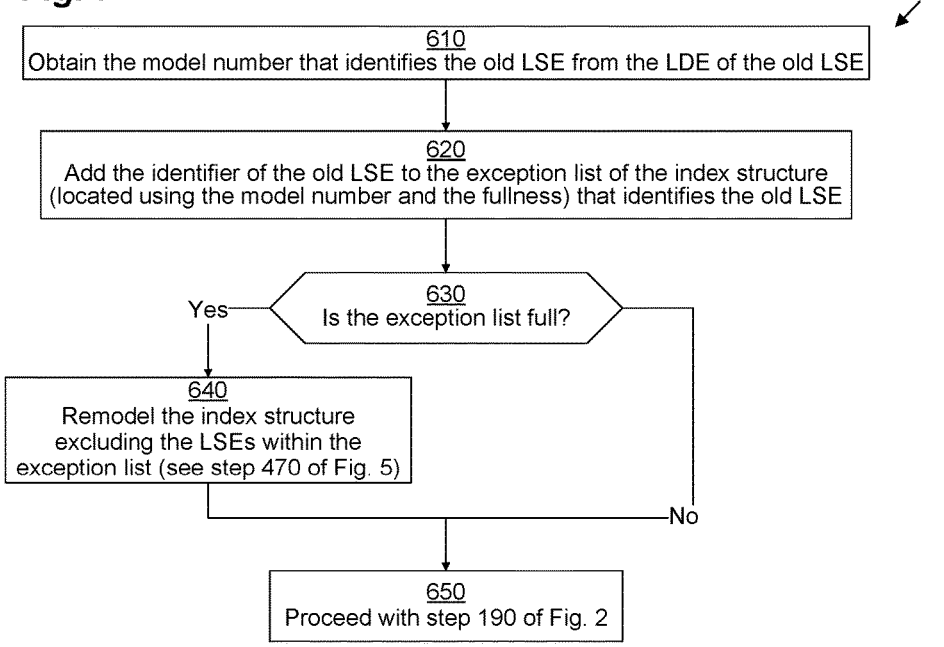

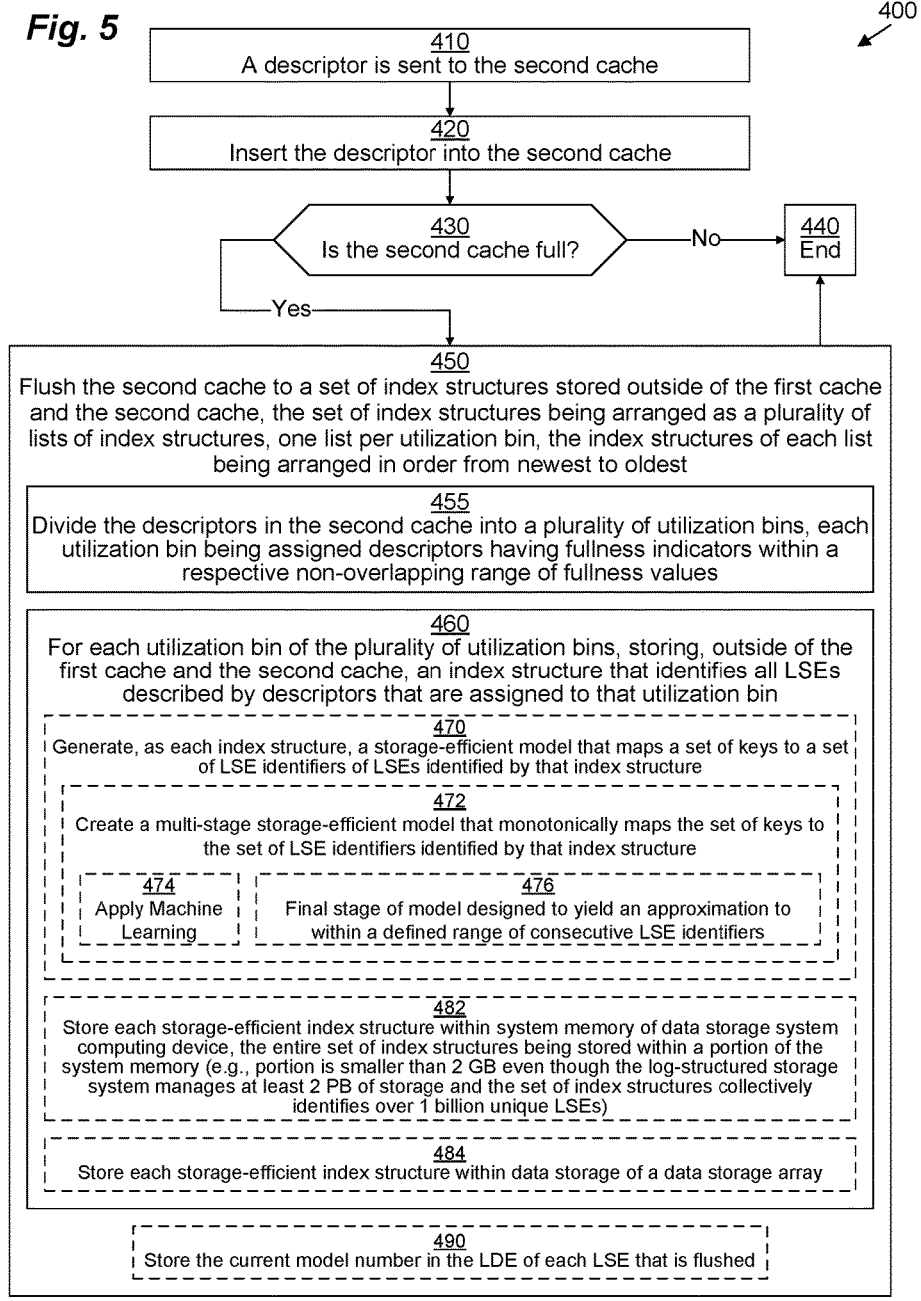

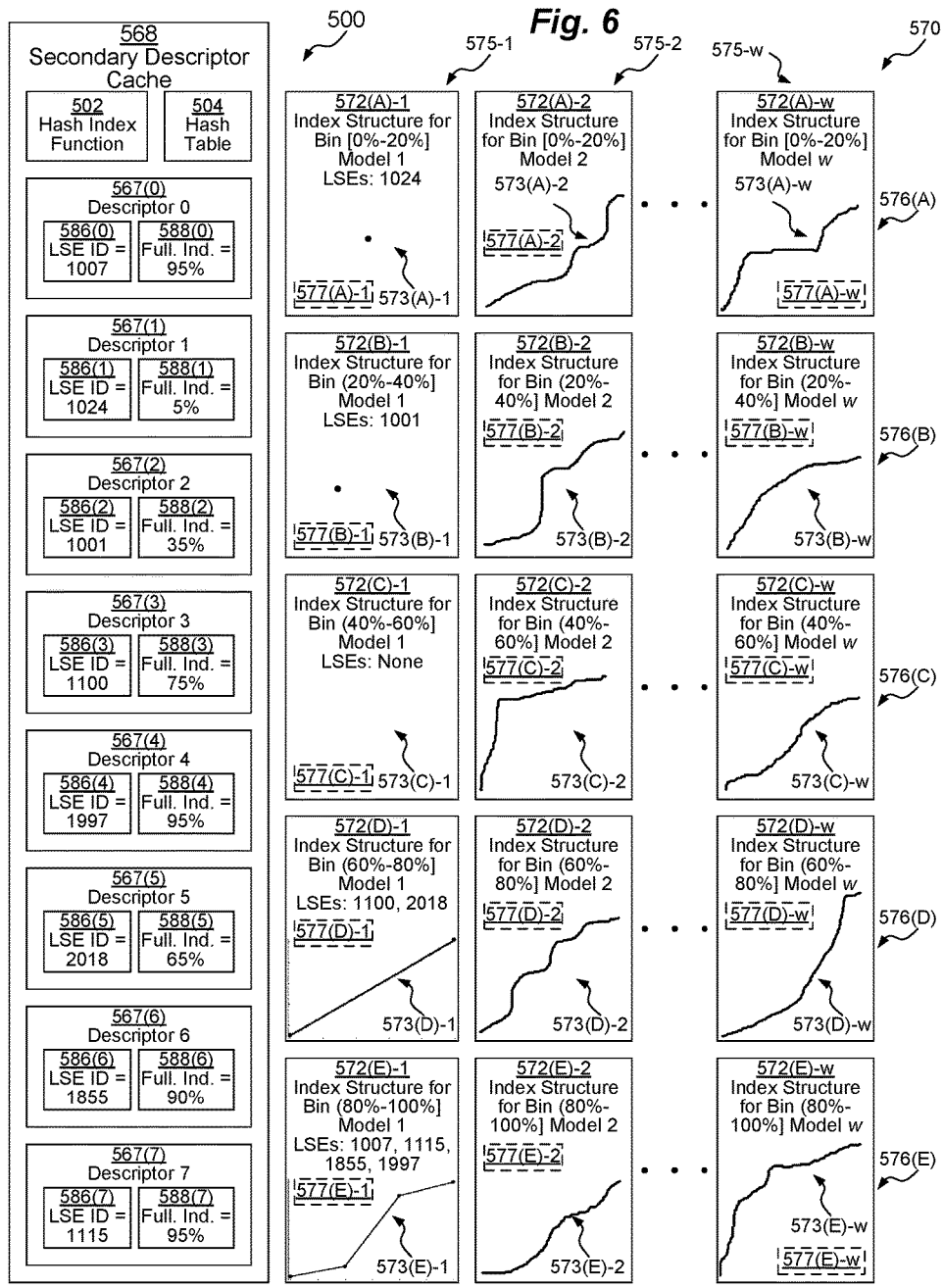

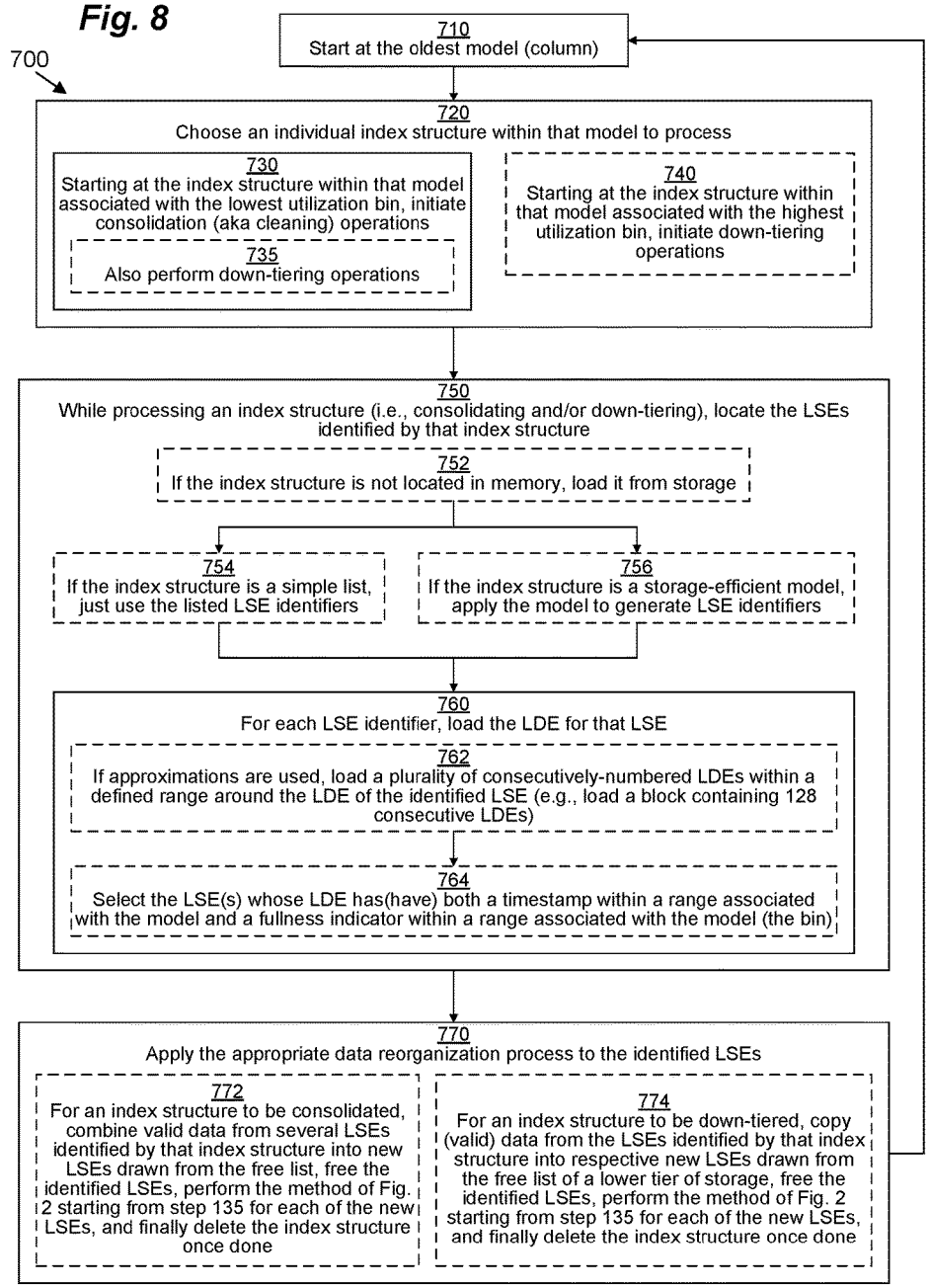

MANAGING DATA IN LOG-STRUCTURED STORAGE SYSTEMS

BACKGROUND

A conventional log-structured storage system writes data into a sequential structure called a log, which is backed by non-volatile storage. For example, the log may be provided as a series of segments of equal size. When the log-structured storage system accumulates enough data to write a full segment, the system writes the accumulated data into a next free segment. If earlier values of any of the newly-written data had previously been written to another segment in the series, the log-structured storage system invalidates the previous values when it writes the new ones.

If all of the portions of data in an earlier-written segment become invalidated, the log-structured storage system considers that earlier-written segment to be free and thus available for reuse. Additionally, the log-structured storage system may proactively consolidate valid data from partially used segments, e.g., by emptying such segments and consolidating their valid data in new segments. The emptied segments then become free, and thus available to receive new data.

SUMMARY

Unfortunately, selecting the best segments to consolidate becomes increasingly complex as the size of the log increases, especially when using flash-based storage devices. Flash-based storage devices are typically rated for only a limited number of writes per sector before the devices wear out. Thus, it is desirable to avoid unnecessarily consolidating the same data repeatedly. For example, it is generally better to wait until a segment has been inactive (not recently written to or modified), since the likelihood of further modification to a segment tends to decrease the longer the segment remains inactive. In principle, a large least-recently-updated (LRU) type cache could select the LRU segments for consolidation. However, the amount of data that would have to be stored in such a cache could quickly exceed the memory available on the data storage system once the log reaches a certain size. For example, in some systems, a 1 petabyte (PB) log would require at least 16 gigabytes (GB) of memory just dedicated to the LRU cache for consolidation analysis. Since many data storage systems only have a total of 32 or 64 GB of system memory, dedicating so much memory to just this one subsystem is not efficient, and the problem only gets worse as the log size increases.

Thus, it would be desirable to maintain the information that would be available from an LRU cache but using a significantly reduced memory footprint in order to effectively perform consolidation of segments. This may be accomplished by using a 2-tiered cache and a set of index structures. A first cache stores descriptors of very hot (i.e., recently-written) segments, while an overflow second cache stores descriptors of less-hot segments (i.e., those updated somewhat recently but not updated again in some time). When this second cache becomes full, the information contained within the second cache may be converted into a set of index structures that identifies the less-hot segments. These index structures may either be stored in a space-efficient manner or they may be stored in persistent storage rather than in memory. These index structures may build up over time. The oldest of these index structures represent the segments which have been updated the least recently, and are therefore the coldest. In some examples, a garbage collection process may be run first on the segments that are identified by the coldest index structures. The index structures can be further arranged into utilization ranges, so that low utilization segments may be further prioritized for garbage collection. In other examples, a down-tiering of data may be run such that the coldest segments may be moved into a separate log made up of lower-tier (e.g., slower) storage.

In one embodiment, a method of managing data storage resources in a log-structured storage system is provided. The log-structured storage system stores newly-written data within log storage extents (LSEs), each LSE being a contiguously-addressable extent of storage. The method includes (a) fulfilling write requests by storing the newly-written data in free LSEs and storing respective descriptors of those LSEs within a first cache within computer memory, (b) in response to detecting that storing, within the first cache, a first descriptor of a first LSE causes the first cache to overflow, evicting a second descriptor of a second LSE from the first cache to a second cache within the computer memory based on an age eviction policy, the first cache and the second cache each configured to store a respective plurality of descriptors, each descriptor including (i) an identifier of a respective LSE described by that descriptor and (ii) a fullness indicator that indicates a level of fullness with valid data of the respective LSE identified by that descriptor, (c) in response to detecting that evicting the second descriptor to the second cache causes the second cache to become full, flushing the second cache to a set of index structures by (1) dividing the plurality of descriptors in the second cache into a plurality of utilization bins, each utilization bin being assigned descriptors having fullness indicators within a respective non-overlapping range of fullness values, and (2) for each utilization bin of the plurality of utilization bins, storing, outside of the first cache and the second cache, an index structure that identifies all LSEs described by descriptors that are assigned to that utilization bin, (d) repeating step c with new index structures of the set of index structures whenever the second cache becomes full, the set of index structures being arranged as a plurality of lists of index structures, one list per utilization bin, the index structures of each list being arranged in order from newest to oldest, and (e) performing data reorganization on LSEs identified by the index structures of the set of index structures such that the data reorganization is performed on LSEs of older index structures within each list prior to newer index structures within that list. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 2 is a flowchart depicting example methods of various embodiments.

FIG. 3 is a flowchart depicting example methods of various embodiments.

FIG. 5 is a flowchart depicting example methods of various embodiments.

FIG. 6 is a block diagram depicting example data structures used in connection with various embodiments.

FIG. 7 is a flowchart depicting example methods of various embodiments.

FIG. 8 is a flowchart depicting example methods of various embodiments.

DETAILED DESCRIPTION OF THE INVENTION

Embodiments are directed to techniques for managing data storage resources in a log-structured storage system while using a significantly reduced memory footprint in order to effectively perform consolidation of segments. This may be accomplished by using a 2-tiered cache and a set of index structures. A first cache stores descriptors of very hot (i.e., recently-written) segments, while an overflow second cache stores descriptors of less-hot segments (i.e., those updated somewhat recently but not updated again in some time). When this second cache becomes full, the information contained within the second cache may be converted into a set of index structures that identifies the less-hot segments. These index structures may either be stored in a space-efficient manner or they may be stored in persistent storage rather than in memory. These index structures may build up over time. The oldest of these index structures represent the segments which have been updated the least recently, and are therefore the coldest. In some examples, a garbage collection process may be run first on the segments that are identified by the coldest index structures. The index structures can be further arranged into utilization ranges, so that low utilization segments may be further prioritized for garbage collection. In other examples, a down-tiering of data may be run such that the coldest segments may be moved into a separate log made up of lower-tier (e.g., slower) storage.

Figure 1:
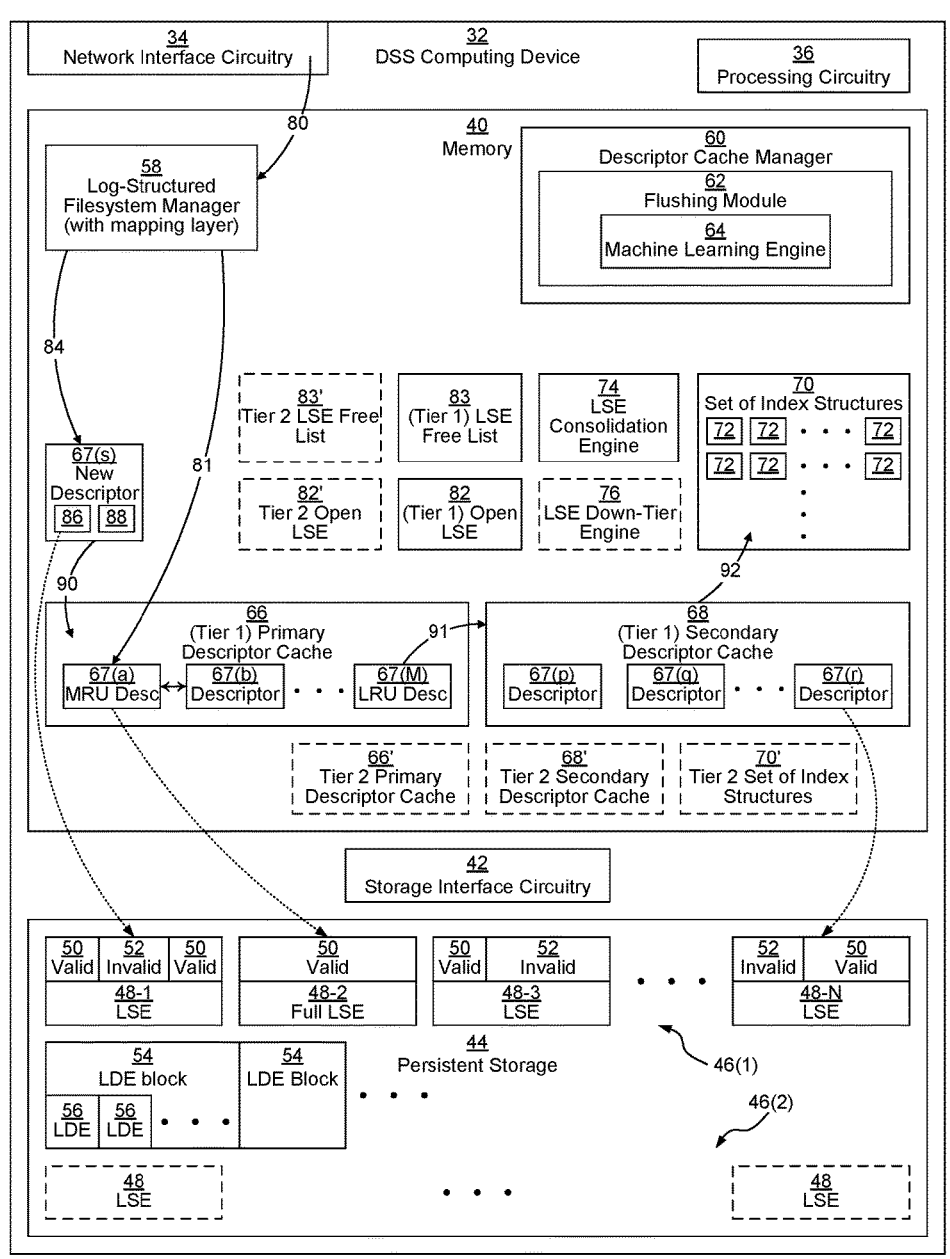
FIG. 1 is a block diagram depicting an example system and apparatus for use in connection with various embodiments.

FIG. 1 depicts an example environment 30 including a computing device 32 serving as a data storage system (DSS). DSS computing device 32 may be any kind of computing device, such as, for example, a personal computer, workstation, server computer, enterprise server, DSS rack server, laptop computer, tablet computes, smart phone, mobile computer, etc. In an example, computing device 32 is a DSS rack server such as an XtremIO-series or Cyclone-based Unity x50F-series All-Flash enterprise storage apparatus produced by Dell/EMC of Hopkinton, Mass.

DSS computing device 32 includes network interface circuitry 34, processing circuitry 36, memory 40, storage interface circuitry 42, and persistent data storage 44. DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network 35. Network interface circuitry 34 allows the DSS computing device 32 to communicate with one or more host devices 37 capable of sending data storage commands to the DSS computing device 32 over network 35 for fulfillment.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

In some embodiments, DSS computing device 32 may be built as a set of two or more storage controller boards (not depicted) each mounted on a separate shelf of a storage rack, each storage controller board having its own network interface circuitry 34, processing circuity 36, memory 40, and storage interface circuitry 42, but sharing the storage 44 with one or more other storage controller boards. In such embodiments, a high-speed inter-controller bus (such as, for example, an InfiniBand interconnect) may connect the storage controller boards. There may be more than one storage controller board installed in DSS 32 for redundancy and performance reasons. In these embodiments, each storage controller board may be considered either independently or as a combined entity for purposes of this disclosure.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports. Persistent storage 44 may be arranged in a redundant storage configuration (e.g., RAID). For example, in some embodiments, a 4+1 RAID-5 or 4+2 RAID-6 configuration is used with data stripe sizes of 2 megabytes (MB) each (512 kilobytes (KB) times 4 data strips per stripe). Persistent storage 44 is logically divided into a plurality of log-structured extents (LSEs) 48, each of which is an extent of contiguously-addressable data. In some embodiments, each LSE 48 is made up of exactly one data stripe (e.g., 2 MB).

In some embodiments, persistent storage 44 may be made up of several different types of drives, the drives of each different type combining into its own respective storage tier 46. Thus, for example, in one embodiment, one tier 46(1) is made up of very high performance drives (e.g., phase-change memory based drives or SLC NAND flash based drives), while another tier 46(2) is made up of moderately high performance drives (e.g., MLC NAND flash based drives). Each tier 46 has its own respective pool (not depicted) of LSEs 48. Persistent storage 44 also includes various other metadata structures which may be maintained separately from the LSEs 48. For example, persistent storage 44 stores an LSE Descriptor Element (LDE) 56 for each LSE 48, each LDE 56 including various metadata about its respective LSE 48. In one embodiment, each LDE is 32 bytes long and 128 LDEs 56 are stored per 8-KB block of storage, which may be referred to as an LDE block 54. Each LSE 48 has a unique identifier. For example, the LSEs 48 of each tier 46 may be numbered with consecutive integers, and the LDEs 56 may also be laid out consecutively in the same order as the LSE identifiers of their respective LSEs 48. Because the position of the LDEs 56 is consecutive, in some embodiments, an LDE 56 need not store the identifier of its respective LSE 48, since the identifier can be inferred from its position. Each LDE 48 stores a timestamp of when its respective LSE was last updated, a fullness indicator indicating how full its respective LSE 48 is (e.g., what percentage of the LSE 48 contains valid data as opposed to out-of-date invalid data) and various additional information about its respective LSE 48.

Memory 40 may be any kind of digital system memory, such as, for example, random access memory (RAM). Memory 40 stores an operating system (OS, not depicted) in operation (e.g., a Linux, UNIX, Windows, MacOS, or similar operating system kernel). Memory 40 also stores a log-structured filesystem manager 58 which executes on processing circuitry 36 to fulfill data storage requests 80 received from hosts (not depicted). In some embodiments, the data storage requests 80 are file-based requests, and the log-structured filesystem manager 58 is configured to map addresses within files to particular block addresses within segments (not depicted) of a log (not depicted). Ultimately, lower-level drivers (not depicted) may compress or otherwise reduce the size (e.g., via data de-duplication techniques) of these segments so that several segments may fit within an LSE 48 provided by persistent storage 44. Memory 40 also stores a descriptor cache manager 60 and an LSE consolidation engine 74, which also execute on processing circuitry 36. Descriptor cache manager 60 may also include various components such as a flushing module 62 and a machine learning engine 64. Memory 40 also stores various data structures including various descriptors 67, a primary descriptor cache 66, a secondary descriptor cache 68, a set 70 of index structures 72, a currently-open LSE 82, and an LSE free list 83. In some embodiments, memory 40 also store an LSE down-tiering engine 76, which also execute on processing circuitry 36, as well as additional data structures for different tiers 46 (e.g., a second tier primary descriptor cache 66', a second tier secondary descriptor cache 68', a second tier set 70' of index structures 72, a second tier currently-open LSE 82', and a second tier LSE free list 83'). Memory 40 may also store various other data structures used by the OS, the log-structured filesystem manager 58, the descriptor cache manager 60, the flushing module 62, the machine learning engine 64, the LSE consolidation engine 74, the LSE down-tiering engine 76, and various other applications (not depicted).

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS computing device 32 is powered off. The OS, applications, log-structured filesystem manager 58, descriptor cache manager 60, flushing module 62, machine learning engine 64, LSE consolidation engine 74, and LSE down-tiering engine 76 are typically stored in this persistent storage portion of memory 40 or on persistent storage 44 so that they may be loaded into a system portion of memory 40 from this persistent storage portion of memory 40 or persistent storage 44 upon a system restart or as needed. The log-structured filesystem manager 58, the descriptor cache manager 60, the flushing module 62, the machine learning engine 64, the LSE consolidation engine 74, and the LSE down-tiering engine 76, when stored in non-transient form either in the volatile portion of memory 40 or on persistent storage drives 44 or in persistent portion of memory 40, each form a computer program product. The processing circuitry 36 running one or more applications thus forms a specialized circuit constructed and arranged to carry out the various processes described herein.

In operation, a host sends data storage requests 80 to log-structured filesystem manager (LSFM) 58, which processes these commands. A data storage request 80 may be of various types, includes READ and WRITE requests, for example. In some examples, data storage requests 80 are file-based requests aimed at logical addresses within files (not depicted) of filesystems (not depicted) that are stored on logical disks (LUNs, not depicted) that are backed by persistent storage 44 as is well-known in the art. In these embodiments, LSFM 58 translates the logical addresses within files into logical block addresses within segments of a log, and these logical block addresses are eventually translated into physical block addresses within PSEs 48 of persistent storage. There may be data compression and deduplication that cause several segments to be mapped to a single LSE 48. In other examples, data storage requests 80 are block-based requests aimed at offsets within particular LUNs. In these embodiments, the LSFM 58 may translate these offsets into logical block addresses within segments of a log, and these logical block addresses are eventually translated into physical block addresses within PSEs 48 of persistent storage, as above.

All write requests are fulfilled by LSFM 58 writing data into an open LSE 82. In some embodiments, the new data may be written immediately to an LSE 48 within persistent storage 44 that serves in place of the open LSE 82, while in other embodiments, only once the open LSE 82 is filled within memory 40 is the data of the open LSE 82 written to an empty LSE 48 within persistent storage 44. In any case, new data is only ever written to the open LSE 82 (or to the open LSE 48 on persistent storage 48), but data is never directly overwritten. Rather, if data ever needs to be overwritten, the old location of that data is invalidated (so the data stored there is invalid 52 rather than valid 50) and remapped to a location in the open LSE 82 as written to an LSE 48 in persistent storage 44.

In example operation, upon LSFM 58 fulfilling one or more write requests 80 by writing to open LSE 82 that gets stored on persistent storage 44 as full LSE 48-2 (which is "full" because it is entirely filled with valid data 50) LSFM 58 updates the LDE 56 that maps to that LSE 48-2 with a current timestamp and an indication that LSE 48-2 is 100% full. In addition, LSFM 58 stores 81 a descriptor 67(*a*) at the head of primary descriptor cache that also stores an identifier (not depicted) of that LSE 48-2 and a fullness indicator (not depicted) of that LSE 48-2 that indicates 100% fullness. Subsequently, a new write operation 80 may come in that seeks to overwrite some data that was stored in LSE 48-1, which was previously filled with valid data 50. Thus, LSFM 58 creates a new descriptor 67(*s*) for LSE 48-1 (if a descriptor 67 for LSE 48-1 was not already stored within primary descriptor cache 66 or secondary descriptor cache 68). Descriptor 67(*s*) includes an LSE identifier 86 that points to LSE 48-1 as well as a fullness indicator 88. LSFM 58 also marks the overwritten data of LSE 48-1 as invalid 52 by marking various metadata (not depicted). Fullness indicator 88 indicates how full LSE 48-1 is with valid data 50. If the data is being overwritten rather than merely deleted, LSFM 58 also stores the new data within open LSE 82 (this step is not depicted in FIG. 1). LSFM 58 then pushes (step 90) the new descriptor 67(*s*) to the head of the primary descriptor cache 66. If the primary descriptor cache 66 is full, then the descriptor cache manager 60 evicts (step 91) a least-recently-updated (LRU) descriptor 67(M) to the secondary descriptor cache 68. Primary descriptor cache 66 has a fixed maximum size (e.g., 100 MB capable of storing 10 million descriptors 67). Once the secondary descriptor cache 68 becomes full (e.g., it reaches its maximum size of, for example, 100 MB storing 10 million descriptors 67), flushing module 62 closes the secondary descriptor cache 68 to new entries and flushes (step 92) information from the descriptors 67(p), 67(q), ..., 67(r) into index structures 72 of the set 70 of index structures 72. Each index structure 72 identifies a list of LSEs 48 that were identified by descriptors 67 within the secondary descriptor cache 68 at a particular flushing time. Typically, the secondary descriptor cache 68 is flushed into several different index structures 72, each one dedicated to descriptors that included fullness indicators 88 within a respective fullness range. For example, ten utilization bins may be used (e.g., [0-10%], (10-20%], (20-30%], ..., (90-100%]), in which case each time the secondary descriptor cache 68 is flushed, ten new index structures 72 are added to the set 70. In some embodiments, data reduction techniques may be used to minimize the size of each of the index structures. For example, in some embodiments, machine learning engine 64 applies machine learning techniques learn a multi-stage space-efficient mathematical model of the LSE identifiers of each index structure 72. In some embodiments, instead of storing the set 70 within system memory, the set 70 is stored within persistent storage 44.

In the background, LSE consolidation engine 74 may operate to perform a consolidation operation on the LSEs 48 identified by the oldest index structures 72 of the set, focusing first on the oldest index structures 72 that are associated with utilization bins indicating the lowest fullnesses (e.g., [0-10%] and (10-20%]). Upon consolidation, LSE consolidation engine 74 is able to place identifiers of newly-emptied LSEs 48 onto the LSE free list 83 for later re-use.

In addition, in some embodiments, LSE down-tiering engine 76 may operate to perform a down-tiering operation on the LSEs 48 identified by the oldest index structures 72 of the set, focusing first on the oldest index structures 72 that are associated with utilization bins indicating the highest fullnesses (e.g., (80-90%] and (90-100%]). Since the oldest index structures 72 identify LSEs 48 that are very cold, it makes sense to place them in a lower tier 46 of persistent storage. In some embodiments, a separate primary descriptor cache 66, secondary descriptor cache 68, set 70, and LSE free list 83 are used for every tier 46. However, LSE down-tiering engine 76 does not operate on the set 70 for the lowest tier 46, since there is no lower tier to down-tier to. Upon down-tiering, LSE down-tiering engine 76 is able to place identifiers of newly-emptied LSEs 48 onto the LSE free list 83 for the appropriate tier 46 for later re-use.

FIG. 2 illustrates an example method 100 performed by DSS computing device 32 for managing data storage resources in log-structured storage in accordance with various embodiments. It should be understood that any time a piece of software (e.g., LSFM 58, descriptor cache manager 60, flushing module 62, machine learning engine 64, LSE consolidation engine 74, or LSE down-tiering engine 76) is described as performing a method, process, step, or function, in actuality what is meant is that a computing device (e.g., DSS computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order.

In step 110, LSFM 58 receives a write request 80 directed at a log-structured filesystem. This may involve performing various mapping operations as is well-known in the art. In some embodiments, instead of being directed at a log-structured filesystem, the write request 80 may be a block-based command directed at a log-structured logical disk.

In step 115, LSFM 58 determines whether or not the write request 80 is an overwrite/delete request or an initial write of data to a logical address. If the write request 80 is an initial write, then operation proceeds with step 120 but not with step 150. If the write request 80 is an overwrite request, then operation proceeds with both steps 120 and 150 in parallel. Being performed in parallel means that the order of execution of these steps 120, 150 (and the chains of steps that follow each) is unimportant; they may be performed simultaneously, in an overlapping manner, or any of them may be performed prior to or subsequent to the other(s). If the write request 80 is a delete request, then operation proceeds with step 150 but not with step 120. Although depicted as a step, step 115 may represent a logical branching without any actual actions performed.

In step 120, LSFM 58 writes the data of the write request to the open LSE buffer 82. Then, in step 125, LSFM 58 determines whether or not the open LSE buffer 82 is full. If the open LSE buffer 82 is not yet full, operation waits until further writes come in and the LSE buffer 82 fills up. If the open LSE buffer 82 is full, then operation proceeds with step 130. Although depicted as a step, step 125 may represent a logical branching without any actual actions performed.

In step 130, LSFM 58 writes the open LSE buffer 82 to an empty LSE 48 on persistent storage 44. LSFM 58 may identify the empty LSE 48 with reference to the LSE free list 83 as is well-known in the art. LSFM 58 also updates the LDE 56 associated with that LSE 48 with a current timestamp to indicate that the current time is the last time that that LSE 48 was updated. LSFM 58 also updates the LDE 56 associated with that LSE 48 with a fullness indicator indicating that that LSE 48 is full with valid data 50 (e.g., 100% utilization). Operation then proceeds with step 135.

It should be understood that steps 120-130 are described in the context of an embodiment in which writes are done to the open LSE buffer 82 in memory 40 and the entire open LSE buffer 82 is flushed to persistent storage 44 once it is full. However, in other embodiments in which data is written directly to an open LSE 48 on persistent storage 44, the order of operations will differ. For example, step 130 may directly follow step 115 (except that the fullness indicator that is written to the LDS 56 may not indicate 100% fullness until the LSE 48 is actually full), and then step 125 would follow to determine whether the open LSE 48 on persistent storage 44 is full. In such embodiments, an affirmative result to step 125 would result in proceeding directly to step 135.

In step 135, descriptor cache manager adds a descriptor 67 to the head of the primary descriptor cache 66 with the a fullness indicator 88 indicating that that LSE 48 is full with valid data 50 (e.g., 100% utilization) and an identifier of the LSE 48 that the open LSE 82 was written to as its LSE identifier 86. Performance of step 135 may include performance of method 200 described below in connection with FIG. 3.

Finally, in step 140, LSFM 58 may update mapping information within the log-structured filesystem to indicate that the logical address is stored within the LSE 48 on persistent storage 44 as is well-known in the art.

Returning back to step 115, in the event that the write request 80 is an overwrite or a delete operation, operation proceeds with step 150.

In step 150, LSFM 58 "punches a hole," so to speak, in the LSE 48 where the old data stored at the logical address of the overwrite was physically stored (referred to as old LSE 48-*x*). LSFM 58 does this by updating mapping information within the log-structured filesystem that causes the old data on the old LSE 48-*x* to be marked as invalid data 52.

In step 160, LSFM 58 obtains an up-to-date fullness value of the old LSE 48-*x* by referring to the updated mapping information within the log-structured filesystem. For example, say that prior to performing step 150, old LSE 48-*x* stored 1,648 KB of valid data 50 and 400 KB of invalid data 52 for a utilization of approximately 80.5%. In this example, the overwrite request overwrites 16 blocks of data. 16 blocks would take up 128 KB of space, but, due to compression and data de-duplication, say that it only takes up 27 KB. After performance of step 150, old LSE 48-*x* now includes only 1,648−27=1,621 KB of valid data 50, which means that the up-to-date fullness value of the old LSE 48-*x* becomes approximately 79.2%. In some embodiments instead of storing the fullness value as a high precision value (e.g., as percentage to a precision of 1/10 of a percent), the fullness value may be stored to a much lower precision, such as a placement within a utilization bin having a size of 10%. Thus, in the example, the fullness value would initially be within utilization bin (80%-90%] and it would decrease to (70%-80%].

In step 170, LSFM 58 updates the LDE 56 associated with the old LSE 48-*x* in persistent storage 44 with a new fullness indicator (based on the up-to-date fullness value calculated in step 160) and timestamp (the current time). This step may involve locating the particular LDE 56 associated with the old LSE 48-*x* by indexing into the proper LDE block 54 as identified by the identifier of the old LSE 48-*x*.

In step 175, descriptor cache manager 60 determines whether or not a descriptor 67 of the old LSE 48-*x* is already stored within either of the descriptor caches 66, 68. In some embodiments, the descriptor caches are arranged as hash tables, so step 175 may be accomplished by applying a hash function to the LSE identifier of the old LSE 48-*x* and looking up that hash value in the hash tables of the descriptor caches 66, 68. If a descriptor 67 of the old LSE 48-*x* is not found in either of the descriptor caches 66, 68, operation proceeds with step 180. If a descriptor 67 of the old LSE 48-*x* is found in either of the descriptor caches 66, 68, operation proceeds with step 185. Although depicted as a step, step 175 may represent a logical branching without any actual actions performed.

In step 180, descriptor cache manager 60 creates a new descriptor 67(*s*) having the LSE indicator of the old LSE 48-*x* as its LSE identifier 86. Step 180 also includes descriptor cache manager 60 storing a fullness indicator 88 (based on the up-to-date fullness value calculated in step 160) within the new descriptor 67. In addition, descriptor cache manager 60 also performs method 600 of FIG. 7, as described below, after which operation proceeds with step 190.

In step 185, since a descriptor 67 (e.g., descriptor 67(*t*), not depicted) has already been found in one of the descriptor caches 66, 68 identifying the old LSE 48-*x*, descriptor cache manager 60 updates descriptor 67(*t*) with an up-to-date fullness indicator 88 (based on the up-to-date fullness value calculated in step 160). Operation then proceeds with step 190.

In step 190, descriptor cache manager 60 inserts the descriptor 67(*s*) (if step 180 was performed) or 67(*t*) (if step 185 was performed) at the head of the primary descriptor cache 66. This may involve performance of method 200 of FIG. 3.

FIG. 3 illustrates an example method 200 performed by descriptor cache manager 60 for inserting descriptors 67 into the primary descriptor cache 66. It should be understood that one or more of the steps or sub-steps of method 200 may be omitted in some embodiments. Similarly, in some embodiments, one or more steps or sub-steps may be combined together or performed in a different order. Method 200 is performed by DSS computing device 32.

In step 210, a descriptor 67(*t*) is sent to the primary descriptor cache 66 for insertion at its head. Then, in step 220, descriptor cache manager 60 places the descriptor 67(*t*) at the head of the primary descriptor cache 66, updating the most-recently-updated (MRU) descriptor 67(*a*) that was previously at the head of the primary descriptor cache 66 as appropriate.

Figure 4A:
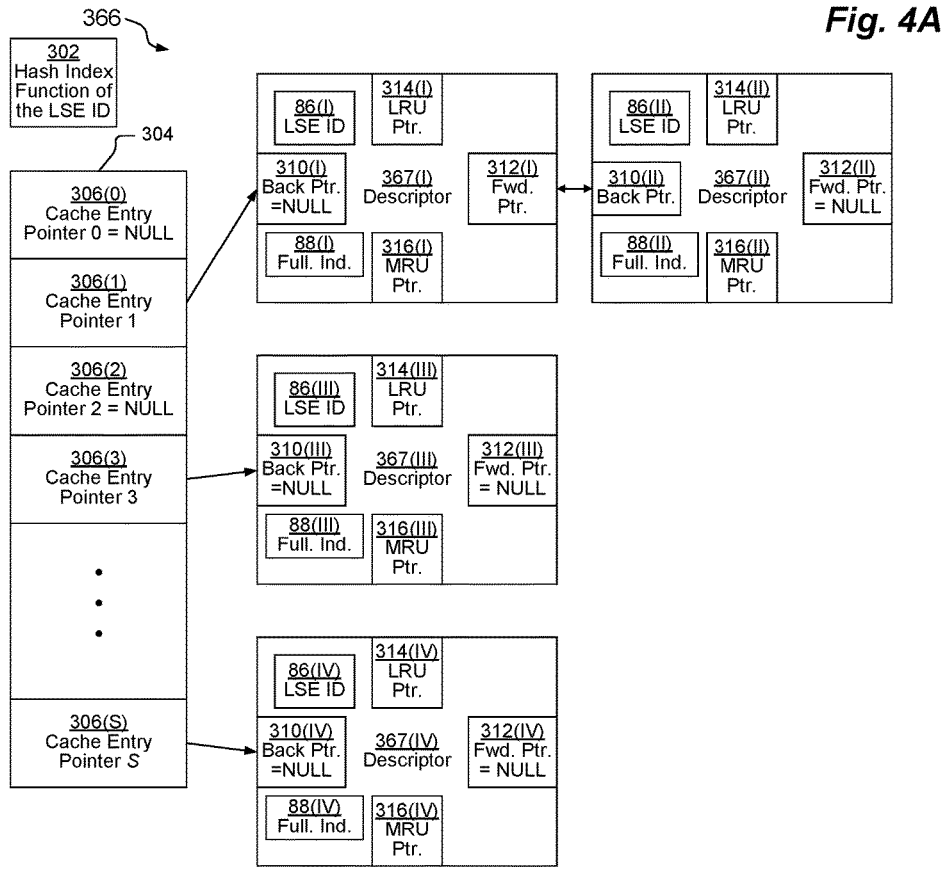
FIGS. 4A and 4B are block diagrams depicting different views of an example data structure used in connection with various embodiments.
Figure 4B:
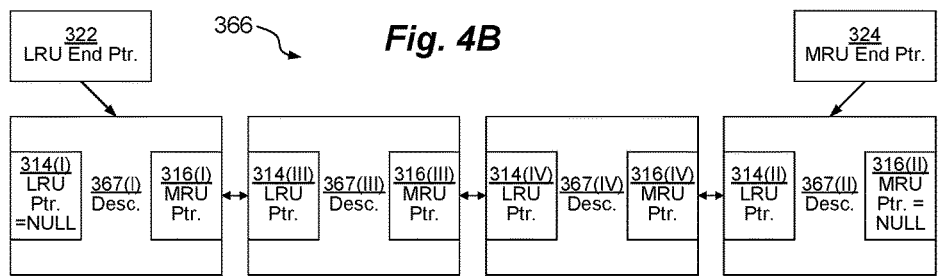

FIGS. 4A and 4B depict different views of an example arrangement 366 of the primary descriptor cache 66 according to one embodiment. In example arrangement 366, primary descriptor cache 66 includes a hash index function 302 which is configured to receive an LSE identifier as an input and to output an index within the range of zero to S for some integer S (e.g., S=1 million). Hash index function 302 is designed to evenly distribute all possible LSE identifiers (e.g., ranging from zero to $2^{32}-1$) into S+1 bins. Hash index function 302 includes a cryptographic hashing algorithm. In an example, the hashing algorithm is SHA-2, although this is not required, as other algorithms may also be used, such as SHA-0, SHA-1, SHA-3, and MD5. Such algorithms may provide bit-depths such as 128 bits, 160 bits, 172 bits, 224 bits, 256 bits, 384 bits, and 512 bits, for example. Preferably an advanced hashing algorithm with a high bit-depth is used to ensure a low probability of hash collisions between different data blocks.

The output of hash index function 302 is used as an index into an array 304 of cache entry pointers 306 (depicted as cache entry pointers 306(0), 306(1), 306(2), 306(3), . . . , 306(S)), which may be sparsely populated. Thus, as depicted, many of the cache entry pointers 306 have NULL values. Other cache entry pointers 306(1), 306(3), 306(S) point to descriptors 367 (depicted as descriptors 367(I), 367(I), 367(III), 367(IV)), which may be arranged in linked lists.

Each descriptor 367 includes an LSE identifier 86 and a fullness indicator 88. As depicted, descriptor 367(I) has LSE identifier 86(I) and fullness indicator 88(I); descriptor 367(II) has LSE identifier 86(II) and fullness indicator 88(II); descriptor 367(III) has LSE identifier 86(III) and fullness indicator 88(III); and descriptor 367(IV) has LSE identifier 86(IV) and fullness indicator 88(IV).

Each descriptor 367 may also store a back pointer 310 and a forward pointer 312 to effectuate a linked list structure for each bin associated with each respective cache entry pointer 306 (although, in some embodiments, only a forward pointer 312 is used, thereby effectuating only a singly-linked list rather than a doubly-linked list). As depicted, cache entry pointer 306(1) points to a linked list having descriptors 367(I), 367(II). Descriptor 367(I) has a NULL back pointer 310(I) indicating that it is the first descriptors 367 in the linked list of the bin of cache entry pointer 306(1). Descriptor 367(I) also has a forward pointer 312(I) that points to the next descriptor 367(II) in the linked list of the bin of cache entry pointer 306(1). Descriptor 367(II) has a back pointer 310(II) that points to the previous descriptor 367(II) in the linked list of the bin of cache entry pointer 306(1). Descriptor 367(II) also has a NULL forward pointer 312(II) indicating that it is the last descriptor 367 in the linked list of the bin of cache entry pointer 306(1).

As depicted, cache entry pointer 306(3) points to a linked list having only a single descriptor 367(III). Descriptor 367(III) has a NULL back pointer 310(III) indicating that it is the first descriptor 367 in the linked list of the bin of cache entry pointer 306(3). Descriptor 367(III) also has a NULL forward pointer 312(III) indicating that it is the last descriptor 367 in the linked list of the bin of cache entry pointer 306(3).

As depicted, cache entry pointer 306(R) points to a linked list having only a single descriptor 367(IV). Descriptor 367(IV) has a NULL back pointer 310(IV) indicating that it is the first descriptor 367 in the linked list of the bin of cache entry pointer 306(R). Descriptor 367(IV) also has a NULL forward pointer 312(IV) indicating that it is the last descriptor 367 in the linked list of the bin of cache entry pointer 306(R).

Each descriptor 367 may also store a least-recently-updated (LRU) pointer 314 and a most-recently-updated (MRU) pointer 316 to effectuate a linked list structure for deciding which descriptor 367 to evict from the primary descriptor cache 66 when room must be made for a new descriptor 367. See FIG. 4B for a clearer view of this eviction linked list structure. An LRU end pointer 322 points to a first descriptor 367(I) at a least-recently-updated end of the eviction linked list structure, while MRU end pointer 324 points to a last descriptor 367(II) at a most-recently-updated end of the eviction linked list structure.

As depicted, descriptor 367(I) has a NULL LRU pointer 314(I) indicating that it is the least-recently accessed descriptor 367 in the eviction linked list structure. Descriptor 367(I) also has an MRU pointer 316(I) that points to the next descriptor 367(III) in the eviction linked list structure. Descriptor 367(III) has an LRU pointer 314(III) that points to the previous descriptor 367(I) in the eviction linked list structure. Descriptor 367(III) also has an MRU pointer 316(III) that points to the next descriptor 367(IV) in the eviction linked list structure. Descriptor 367(IV) has an LRU pointer 314(IV) that points to the previous descriptor 367(III) in the eviction linked list structure. Descriptor 367(IV) also has an MRU pointer 316(IV) that points to the next descriptor 367(II) in the eviction linked list structure. Descriptor 367(II) has an LRU pointer 314(II) that points to the previous descriptor 367(IV) in the eviction linked list structure. Descriptor 367(II) also has a NULL forward pointer 316(II) indicating that it is the last descriptor 367 in the eviction linked list structure.

The eviction linked list structure is sorted by the order in which the descriptors were placed into (or updated within) the primary descriptor cache 66.

Returning to FIG. 3, in step 220, descriptor cache manager 60 places the descriptor 67($t$) at the head of the primary descriptor cache 66 by applying the hash index function 302 to its LSE identifier 86 to locate its respective cache entry pointer 306 in the hash table 304 and inserting it into a linked list pointed to by that cache entry pointer 306. In addition descriptor cache manager 60 modifies the MRU pointer 316(II) of the head descriptor 367(II) to point to descriptor 67($t$) and also modifies the LRU pointer 314 of descriptor 67($t$) to point to descriptor 367(II). Descriptor cache manager 60 also modifies the MRU end pointer 324 to point to the descriptor 67($t$), while setting the MRU pointer 316 of descriptor 67($t$) to NULL.

Then, in step 230, descriptor cache manager 60 determines whether or not the primary descriptor cache 66 has become full due to the insertion of descriptor 67($t$). Primary descriptor cache 66 is deemed to be full once it has a maximum number of descriptors 67 stored therein, such as, for example, 1 million descriptors 67. If the primary descriptor cache 66 is not yet full, method 200 terminates (step 240) and operation may continue back with step 140 if initiated as part of step 135 of method 100.

If the primary descriptor cache 66 is full, method 200 proceeds with step 250 by evicting the LRU descriptor 367(I) from the primary descriptor cache 66 into the secondary descriptor cache 68. To do this, descriptor cache manager 60 modifies the LRU pointer 314(III) of the second-to-LRU descriptor 367(III) to be null and modifies the LRU end pointer 322 to point to the descriptor 367(III) instead of previously-LRU descriptor 367(I). Descriptor cache manager 60 also performs method 400 of FIG. 5 to insert the previously-LRU descriptor 367(I) into the secondary descriptor cache 68 prior to terminating (step 240) so that operation may continue back with step 140 if initiated as part of step 135 of method 100.

FIG. 5 illustrates an example method 400 performed by descriptor cache manager 60 for inserting descriptors 67 into the secondary descriptor cache 68. It should be understood that one or more of the steps or sub-steps of method 400 may be omitted in some embodiments. Similarly, in some embodiments, one or more steps or sub-steps may be combined together or performed in a different order. Steps and sub-steps 470, 472, 474, 476, 482, 484, 490 of method 400 that are marked with dashed lines may be deemed to be either optional or representative of alternative embodiments. Method 400 is performed by DSS computing device 32.

In step 410, a descriptor 67(M), 367(I) is sent to the secondary descriptor cache 68 for insertion therein. Then, in step 420 descriptor cache manager 60 inserts the descriptor 67(M), 367(I) into the secondary descriptor cache 68. The same structure for a descriptor 367 as used as in the primary descriptor cache 66 may be used, but the LRU pointers 314 and MRU pointers 316 may be ignored since there is no reason to maintain an MRU-LRU ordering in the secondary descriptor cache 68.

FIG. 6 depicts an example arrangement 500 including an example arrangement 568 of the secondary descriptor cache 68 according to one embodiment. In example arrangement 568, secondary descriptor cache 68 includes a hash index function 502 which is configured to receive an LSE identifier as an input and to output an index in a manner similar to that described above in connection with the example arrangement 366 of the primary descriptor cache 66 of FIG. 4A. Thus, a hash table 504 contains pointers (not depicted) to point to the descriptors 567 of the secondary descriptor cache 68. As depicted in arrangement 568, secondary descriptor cache 68 happens to include eight descriptors 567(0), 567(1), . . . , 567(7). Each descriptor 567 includes an LSE identifier 586 and a fullness indicator 588. As depicted in the example of FIG. 6, descriptor 567(0) includes an LSE identifier 586(0) with a value of 1007 and a fullness identifier 588(0) with a value of 95%; descriptor 567(1) includes an LSE identifier 586(1) with a value of 1024 and a fullness identifier 588(1) with a value of 5%; descriptor 567(2) includes an LSE identifier 586(2) with a value of 1001 and a fullness identifier 588(2) with a value of 35%; descriptor 567(3) includes an LSE identifier 586(3) with a value of 1100 and a fullness identifier 588(3) with a value of 75%; descriptor 567(4) includes an LSE identifier 586(4) with a value of 1997 and a fullness identifier 588(4) with a value of 95%; descriptor 567(5) includes an LSE identifier 586(5) with a value of 2018 and a fullness identifier 588(5) with a value of 65%; descriptor 567(6) includes an LSE identifier 586(6) with a value of 1855 and a fullness identifier 588(6) with a value of 90%; and descriptor 567(7) includes an LSE identifier 586(7) with a value of 1115 and a fullness identifier 588(7) with a value of 95%.

Returning to FIG. 5, in step 430, descriptor cache manager 60 determines whether or not the secondary descriptor cache 68 has become full due to the insertion of descriptor 67(M), 367(I). Secondary descriptor cache 68 is deemed to be full once it has a maximum number of descriptors 567 stored therein, such as, for example, 1 million descriptors 67. It should be understood that the maximum size of the secondary descriptor cache 68 may equal the maximum size of the primary descriptor cache 66 in some embodiments, while in other embodiments the maximum size of the secondary descriptor cache 68 may be different than the maximum size of the primary descriptor cache. If the secondary descriptor cache 68 is not yet full, method 400 terminates (step 440) and operation may continue back with step 240 of method 200.

If the secondary descriptor cache 68 is full, method 400 proceeds with step 450. In step 450, flushing module 62 flushes the entire secondary descriptor cache 68 to a set 70 of index structures 72 which is stored outside of both the secondary descriptor cache 68 and the primary descriptor cache 66. The set 70 is arranged as a plurality of lists 576 (see FIG. 6) of index structures 72, 572, the index structures 72, 572 of each list 576 being arranged in order from newest to oldest. As depicted in FIG. 6, five non-overlapping utilization bins are defined: [0%-20%], (20%-40%], (40%-60%], (60%-80%], and (80%-100%][1]. Each list 576 is associated with a different utilization bin. Thus, as depicted, there are five lists 576(A), 576(B), 576(C), 576(D), 576(E). List 576(A) is associated with utilization bin [0%-20%], list 576(B) is associated with utilization bin (20%-40%], list 576(C) is associated with utilization bin (40%-60%], list 576(D) is associated with utilization bin (60%-80%], and list 576(E) is associated with utilization bin (80%-100%].

[1] The notation [x, y] indicates a range from x to y that includes both endpoints, while the notation (x, y) indicates a range from x to y that does not include either endpoint. The notation [x, y) includes endpoint x but not endpoint y. The notation (x, y] includes endpoint y but not endpoint x.

Each list 576 includes a plurality of index structures 572 arranged by age of insertion into the set 570 from the secondary descriptor cache 68. Thus, as depicted, index structure 572(A)-1 is the newest index structure 72 within list 576(A) that represents utilization bin [0%-20%], index structure 572(A)-2 is the second-newest index structure 72 within list 576(A) that represents utilization bin [0%-20%], and index structure 572(A)-w is the oldest index structure 72 within list 576(A) that represents utilization bin [0%-20%]. Each index structure 572 within a given list 576 has an associated mode number 1, 2, ..., w that represents a particular time when that index structure was inserted. Each model number is associated with a particular model column 575 (depicted as model columns 575-1, 575-2, ..., 575-w) that includes all index structures 572 having that model number. Thus, as depicted, index structure 572(A)-1 represents model 1 within list 576(A) that represents utilization bin [0%-20%], index structure 572(A)-2 represents model 2 within list 576(A) that represents utilization bin [0%-20%], and index structure 572(A)-w represents model w within list 576(A) that represents utilization bin [0%-20%]. Any given model number represents all index structures 72 that were inserted into the set at a particular time from the secondary descriptor cache 68. Thus, index structures 572(A)-2, 572(B)-2, 572(C)-2, 572(D)-2, and 572(D)-2 were all inserted into the set 70 from the secondary descriptor cache 68 at substantially the same time. Although each list 576 is depicted as having the same number, w, of elements, it should be understood that it is possible for some of the lists to have more elements than others, if, for example, a LSE consolidation engine 74 or LSE down-tiering engine 76 has processed more index structures 572 from some lists 576 than others.

Returning to FIG. 5, step 450 includes sub-steps 455 and 460, and, in some embodiments, also sub-step 490. In sub-step 455, flushing module 62 logically divides the descriptors 567 within the secondary descriptor cache 68 into the utilization bins based on their respective fullness indicators 588. Thus, descriptor 567(1) is logically placed within utilization bin [0%-20%] because its fullness indicator 588(1) is 5%, which is within the range [0%-20%]. Descriptor 567(2) is logically placed within utilization bin (20%-40%] because its fullness indicator 588(2) is 35%, which is within the range (20%-40%]. No descriptors 567 are logically placed within utilization bin (40%-60%] because none of the fullness indicators 588 within the example arrangement 568 of the secondary descriptor cache 68 are within the range (40%-60%]. Descriptors 567(3), 567(5) are logically placed within utilization bin (60%-80%] because their fullness indicators 588(3), 588(5) are respectively 75% and 65%, which are both within the range (60%-80%]. Descriptors 567(0), 567(4), 567(6), 567(7) are logically placed within utilization bin (80%-100%] because their fullness indicators 588(0), 588(4), 588(6), 588(7) are respectively 95%, 95%, 90%, and 95%, which are all within the range (80%-100%].

In sub-step 460, for each utilization bin, flushing module 62 stores a respective index structure 572 within set 70 that identifies all of the LSEs 48 that are described by the descriptors 567 that were assigned to that utilization bin in sub-step 455. Thus, in the example arrangement 500 of FIG. 6, when the secondary descriptor cache 668 is flushed, index structures 572(A)-1, 572(B)-1, 572(C)-1, 572(D)-1, and 572(E)-1 are generated and stored within set 570, all of the newly-generated index structures 572(A)-1, 572(B)-1, 572(C)-1, 572(D)-1, and 572(E)-1 having new model number 1.

In some embodiments, sub-step 460 includes sub-sub-step 470. In sub-sub-step 470, flushing module 62 generates a storage-efficient model 573 that maps a set of keys to the set of LSE identifiers 586 of the LSEs 48 that were described by the descriptors 567 that were assigned to the utilization bin of that index structure 572 in sub-step 455. Thus, for example, storage-efficient model 573(E)-1 maps four keys to LSE identifiers 586 having values of 1007, 1115, 1855, and 1997. This may be thought of as a set of coordinates: (1, 1007), (2, 1115), (3, 1855), (4, 1997). This set of coordinates is depicted as plotted in FIG. 6. However, in order to be space-efficient, a mathematical model is used to represent that set of coordinates in a manner that uses less space than a mere listing of the LSE identifiers 586.

In some embodiments, sub-sub-step 470 includes sub-sub-sub-step 472. In sub-sub-sub-step 472, the storage-efficient model 573 that is created is a multi-stage model that maps the coordinates such that the LSE identifiers 586 of the coordinates are in monotonically-increasing order. Thus, even though LSE identifiers 586 of the descriptors 567(10), 567(4), 567(6), 567(7) are valued (1007, 1997, 1855, 1115), the order is rearranged to be monotonically-increasing. In addition, flushing module 62 creates the model in a multi-stage arrangement, such as a tree structure with different mathematical formulae used for different nodes representing different indices or ranges of indices. See, for example, "The Case for Learned Index Structures" by Tim Kraska, Alex Beutel, Ed H. Chi, Jeffrey Dean, and Neoklis Polyzotis (hereinafter Kraska), available at <https://arxiv.org/pdf/1712.01208>, the entire contents and teachings of which are incorporated herein by this reference. For more information on the staged models, see FIG. 3 of Kraska and the accompanying text.

In some embodiments, sub-sub-sub-step 472 includes sub-sub-sub-sub-steps 474 and/or 476. In sub-sub-sub-sub-step 474, the multi-stage storage-efficient model 573 that is created is created by machine learning engine 64 using machine learning, so that each stage is learned using machine learning techniques as is known in the art. See, for example, Kraska, throughout.

In sub-sub-sub-sub-step 476, the lowest-level stage of the multi-stage storage-efficient model 573 may be imprecise such that only an approximation of the LSE identifiers 586 is able to be reconstructed upon applying the multi-stage storage-efficient model 573. However, the approximation is guaranteed to be within a pre-defined range of each actual LSE identifier 586. For example, the approximation may yield a value that is guaranteed to be no larger than the actual LSE identifier 586 and to always be within 128 of the correct values. This allows the approximation to always be to the first LSE 48 identified by an LDE 56 of an LDE block 54.

It should be understood that sub-sub-sub-sub-step 474 may be implemented in conjunction with sub-sub-sub-sub-step 476 in some embodiments, but, in other embodiments, only one or the other of sub-sub-sub-sub-step 474 and sub-sub-sub-sub-step 476 may be used.

Depending on the embodiment, sub-step 460 includes one or the other of sub-sub-step 482 or 484. Sub-sub-step 482 is nearly always paired in embodiments with sub-sub-step 470. Sub-sub-step 484 may also be paired in embodiments with sub-sub-step 470 or it may instead be used in embodiments in which a simpler set of index structures 72 is used that are not storage-efficient models (e.g., simple lists of LSE identifiers 586).

In sub-sub-step 482, flushing module 62 stores each storage-efficient index structure 572 within memory 40 upon creation (but outside of the primary and secondary descriptor caches 66, 68). Thus, the entire set 570 of storage-efficient index structure 572 is stored within a system portion of memory 40. In one embodiment, the portion of system memory 40 in which the set 570 is stored is 1 GB or smaller, even though the combined storage capacity of all LSEs 48 (within the appropriate tier 46) is larger than 1 PB. Since a typical LSE 48 is 2 MB in size, there are over 500 million LSEs 48, which requires approximately 16 GB to store all of the associated LDEs 56. Thus, these embodiments are improvements over the prior art because the memory space required is at least 16 times less.

In sub-sub-step 484, flushing module 62 stores each index structure 72 within persistent storage 44 upon creation rather than within memory 40. This allows the oldest index structures 72 to be retrieved as needed.

Finally, in some embodiments, in sub-step 490, flushing module 62 stores the current model number of the flushed index structures 72 (i.e., what is identified as model number 1 within FIG. 6) within all of the LDEs 56 of the LSEs 48 that are identified by descriptors 567 that are flushed from the secondary descriptor cache 68. This allows particular LSEs 48 to be excluded from the index structures 72 at later times if they are updated (see below in connection with FIG. 7).

FIG. 7 illustrates an example method 600 performed by descriptor cache manager 60 for ensuring that when an LSE 48 is updated after a reference to that LSE 48 has already been inserted into an index structure 72, the reference to that LSE 48 is removed from the index structure 72. Method 600 is performed as part of step 180 of method 100 of FIG. 2. It should be understood that one or more of the steps or sub-steps of method 600 may be omitted in some embodiments. Similarly, in some embodiments, one or more steps or sub-steps may be combined together or performed in a different order. Method 600 is performed by DSS computing device 32.

Recall that method 600 is performed in response to the descriptor cache manager 60 creating a new descriptor 67($s$) having the LSE indicator of the old LSE 48-$x$ as its LSE identifier 86.

In step 610, descriptor cache manager 60 obtains the model number, z, that identifies the old LSE 48-$x$ from the LDE 56 of the old LSE 48-$x$. Descriptor cache manager 60 may read that LDE 56 from persistent storage 44 if not already loaded into memory. Recall that the model number, z, was stored within the LDE 56 in sub-step 490 of method 400 as part of the flushing of the secondary descriptor cache 68 (see FIG. 5).

In step 620, descriptor cache manager 60 adds the identifier of the old LSE 48-$x$ to an exception list 577(Y)-z of the index structure 572(Y)-z that identifies the old LSE 48-$x$. Descriptor cache manager 60 locates that index structure 572(Y)-z by referencing the model number, z, and the fullness indicator obtained from the LDE 56 for the old LSE 48-$x$.

As depicted in FIG. 6, each index structure 572 may include an exception list 577. Thus, for example, index structure 572(A)-1 includes exception list 577(A)-1, index structure 572(B)-2 includes exception list 577(B)-2, and index structure 572(C)-w includes exception list 577(C)-w. Exception list 577(Y)-z identifies any LSEs 48 that are identified by the storage-efficient model 573(Y)-z but which are excluded from being identified by the index structure 572(Y)-z because those LSEs 48 were updated after the index structure 572(Y)-z had already been created, since it is computationally-expensive to re-model the storage-efficient model 573(Y)-z every time an LSE 48 is excluded.

In step 630, descriptor cache manager 60 determines whether or not the exception list 577(Y)-z is full. An exception list 577 is deemed to be full when it includes a threshold maximum number of elements, such as, for example, 1,000. If the exception list 577(Y)-z is full, operation proceeds with step 640. Otherwise, operation proceeds directly with step 650.

In step 640, descriptor cache manager 60 remodels the storage-efficient model 573(Y)-z, excluding all LSE identifiers of the LSEs 48 on the exception list 577(Y)-z. This is done in a manner similar to how the storage-efficient model 573(Y)-z was modeled initially (see sub-step 470 of method 400 in FIG. 5 and accompanying text), except for the exclusion of the LSE identifiers of the LSEs 48 on the exception list 577(Y)-z. This newly re-modeled storage-efficient model 573(Y)-z thus becomes part of the index structure 572(Y)-z.

Finally, in step 650, operation proceeds with step 190 of method 100 of FIG. 2.

FIG. 8 illustrates an example method 700 performed by LSE consolidation engine 74 and LSE down-tiering engine 76 for traversing the set 70 of index structures 72 from oldest to newest and consolidating and/or down-tiering the coldest LSEs 48. It should be understood that one or more of the steps or sub-steps of method 700 may be omitted in some embodiments. Similarly, in some embodiments, one or more steps or sub-steps may be combined together or performed in a different order. Steps and sub-steps 735, 752, 754, 756, 762, 764, 772, and 774 of method 700 that are marked with dashed lines may be deemed to be either optional or representative of alternative embodiments. Method 700 is performed by DSS computing device 32.

In some embodiments, LSE consolidation engine 74 runs in the background, traversing the set 570 of index structures 572 and performing consolidation on the LSEs 48 identified by each traversed index structure 572, prioritizing the oldest index structures 572 having the oldest model numbers as well as prioritizing the index structures 572 that are associated with the lowest-utilization utilization bins. In some embodiments, LSE consolidation engine 74 traverses all index structures 572 in the oldest model column 575-w, working from the lowest utilization bin up (e.g., starting with index structure 572(A)-w, proceeding next with index structure 572(B)-w, etc.), until no more index structures 572 remain in that model column 575-w, at which point, LSE consolidation engine 74 repeats the process on the next-oldest model column 575-(w-1). In some of these embodiments, LSE down-tiering engine 76 operates together with LSE consolidation engine 74 to down-tier each LSE 48 as it is consolidated. In other embodiments, instead of LSE consolidation engine 74 traversing all index structures 572 in each model column 575, LSE consolidation engine 74 instead traverses only the index structures 572 in each model column 575 that are associated with the lowest utilization bin or bins (e.g., index structures 572 within lists 576(A), 576(B), 576(C), and 576(D), but excluding index structures 572 within list 576(E)), leaving the lowest utilization bin or bins to be traversed by the LSE down-tiering engine 76 from oldest to newest. Method 700 will be described in the context of performance by LSE consolidation engine 74 unless otherwise specified, but it should be understood that method 700 may also be performed by LSE down-tiering engine 76 in some embodiments.

In step 710, LSE consolidation engine 74 starts processing of the index structures 572 with the oldest model column 575-w.

In step 720, LSE consolidation engine 74 chooses an individual index structure 572 within the oldest column 575-w to process. In sub-step 730, the index structure 572 of the lowest utilization bin (e.g., index structure 572(A)-w in FIG. 6) is processed by the LSE consolidation engine 74 first, followed by the index structure 572 of the next-lowest utilization bin (e.g., index structure 572(B)-w in FIG. 6), etc. In sub-sub-step 735, LSE down-tiering engine 76 also performs down-tiering on each processed index structure 572 at the same time that it is consolidated (unless it is already in the lowest tier 46(2)).

In some embodiments, in sub-step 740, LSE down-tiering engine 76 works in parallel and begins processing the index structure 572 of the highest utilization bin (e.g., index structure 572(E)-w in FIG. 6) for down-tiering first, followed by the index structure 572 of the next-highest utilization bin (e.g., index structure 572(D)-w in FIG. 6), as long as one remains, etc.

In step 750, while processing each index structure 572 (Y)-z (i.e., consolidating and/or down-tiering), LSE consolidation engine 74 locates the LSEs 48 that are identified by that index structure 572(Y)-z.

In some embodiments, step 750 includes sub-step 752. In sub-step 752, if the index structure 572(Y)-z is not stored in memory 40 (e.g., in embodiments in which the index structures 72 are stored on persistent storage—see sub-sub-step 484 of method 400 in FIG. 5), it is first loaded into memory 40.

In some embodiments, step 750 includes either sub-step 754 or 756. Sub-step 754 is performed in embodiments in which each index structure 72 is a simple list of LSEs 48, while sub-step 756 is performed in embodiments in which each index structure 72 includes a storage-efficient model 573 (see sub-sub-step 470 of method 400 in FIG. 5). Sub-step 754 is typically paired with sub-step 752, although, in some embodiments, sub-step 756 may instead be paired with sub-step 752.

In sub-step 754, LSE consolidation engine 74 simply locates the LSEs 48 identified by the index structure 572 (Y)-z with reference to the list of LSEs 48 maintained therein.

In sub-step 756, LSE consolidation engine 74 locates the LSEs 48 identified by the index structure 572(Y)-z by applying the storage-efficient model 573(Y)-z of that index structure 572(Y)-z to generate the LSE identifiers that are mapped to by the keys of the storage-efficient model 573 (Y)-z (and excluding all LSEs 48 that are identified by the exclusion list 577(Y)-z).

Step 750 also includes sub-step 760. In sub-step 760, LSE consolidation engine 74 loads from the persistent storage 44 the LDE 56 that is associated with each LSE 48 that was identified in sub-step 754 or 756. This may include loading the LDE block 54 in which each LDE 56 is stored.

In embodiments in which only an approximation of the LSE identifiers is able to be reconstructed upon applying each multi-stage storage-efficient model 573 (see sub-sub-sub-step 476 in method 400 of FIG. 5), sub-step 760 includes sub-sub-steps 762 and 764.

In sub-sub-step 762, LSE consolidation engine 74 loads a plurality of consecutively-numbered LDEs 56 around the LDE 56 of each LSE 48 that was identified in sub-step 754 or 756 such a range of a pre-defined length of LDEs 56 is loaded. For example, in one embodiment, the pre-defined length is the number of LDEs 56 per LDE block 54 (e.g., 128), so an entire LDE block 54 is loaded.

In sub-sub-step 764, LSE consolidation engine 74 may search through the LDEs 56 of the loaded LDE block 54, looking for LDEs 56 that include a timestamp that is within a range of times associated with the model column 575-z of the index structure 572(Y)-z. This time range may be defined by a starting time at the time that the index structures 572 of the model column 575-(z+2) two cycles older than the current model column 575-z were flushed from the secondary descriptor cache 68 and by an ending time at the time that the index structures 572 of the previous model column 575-(z+1) were flushed from the secondary descriptor cache 68. LSE consolidation engine 74 also searches the LDEs 56 of the loaded LDE block 54, looking for LDEs 56 that include a fullness indicator that is within a the utilization bin of the index structure 572(Y)-z. An LDE 56 that satisfies both searches represents the true (non-approximate) LSE 48 identified by that index structure 572(Y)-z.

In step 770, LSE consolidation engine 74 or LSE down-tiering engine 76 applies their respective data reorganization process (i.e., either consolidation or down-tiering) to the LSEs 48 that were identified in step 750. Step 770 may either include sub-step 772 or 774 or both.

In sub-step 772, for an index structure 72 to be consolidated, LSE consolidation engine 74 combines valid data 50 from several LSEs 48 identified by that index structure 72 into new LSEs 48 drawn from the LSE free list 83, frees the identified LSEs 48, performs the method of FIG. 2 starting from step 135 for each of the new LSEs 48 (in order to insert descriptors 67 for each of the new LSEs 48 into the primary descriptor cache 66), and finally deletes the index structure 72 being processed, once done. The combining of valid data 50 maye be done in such a way that the valid data 50 is concatenated such that there is no invalid data 52 or free space within the new LSEs 48.

If no down-tiering is to be performed, then the LSE consolidation engine 74 draws the new LSEs 48 from the LSE free list 83 of the same tier 46 as the LSEs 48 of the index structure 72 being processed. However, if down-tiering is to be performed in conjunction with the consolidation, then LSE down-tiering engine 76 draws the new LSEs 48 from the LSE free list 83' of another tier 46 that is lower than the tier 46 of the LSEs 48 of the index structure 72 being processed.

In sub-step 774, for an index structure 72 to be down-tiered, LSE down-tiering engine 76 copies data (possibly excluding invalid data 52) from each LSEs 48 identified by that index structure 72 into a respective new LSE 48 drawn from the free list 83' of a lower tier 46 of storage 44, frees the identified LSEs 48, performs the method of FIG. 2 starting from step 135 for each of the new LSEs 48 (in order to insert descriptors 67 for each of the new LSEs 48 into the primary descriptor cache 66), and finally deletes the index structure 72 being processed, once done.

It should be understood that although embodiments have been described in the context of a DSS computing device 32, similar techniques may be implemented in other contexts, such as, for example, within a single SSD to implement the flash translation layer as a log-structured storage system that performs efficient consolidation/garbage collection.

Thus, techniques have been presented for managing data storage resources in a log-structured storage system while using a significantly reduced memory footprint in order to effectively perform consolidation of segments 48. This may be accomplished by using a 2-tiered cache and a set of index structures 72. A first cache 66 stores descriptors 367 of very hot (i.e, recently-written) segments 48, while an overflow second cache 68 stores descriptors 567 of less-hot segments 48 (i.e., those updated somewhat recently but not updated again in some time). When this second cache 68 becomes full, the information contained within the second cache 68 may be converted into a set of index structures 572 that identifies the less-hot segments 48. These index structures 572 may either be stored within memory 40 in a space-efficient manner or they may be stored in persistent storage 44 rather than in memory 40. These index structures 572 may build up over time. The oldest of these index structures 572 represent the segments 48 which have been updated the least recently, and are therefore the coldest. In some examples, a garbage collection process 74 may be run first on the segments 48 that are identified by the coldest index structures 572. The index structures 572 can be further arranged into utilization ranges 576, so that low utilization segments 48 may be further prioritized for garbage collection. In other example, a down-tiering of data may be run such that the coldest segments 48 may be moved into a separate log made up of lower-tier (e.g., slower) storage 44.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method, performed by a computing device, of managing data storage resources in a log-structured storage system, the log-structured storage system storing newly-written data within log storage extents (LSEs), each LSE being a contiguously-addressable extent of persistent storage, the method comprising:
(a) fulfilling write requests by storing the newly-written data in free LSEs and storing respective descriptors of those LSEs within a first cache within system memory of the computing device;
(b) in response to detecting that storing, within the first cache, a first descriptor of a first LSE causes the first cache to overflow, evicting a second descriptor of a second LSE from the first cache to a second cache within the system memory based on an age eviction policy, the first cache and the second cache each configured to store a respective plurality of descriptors, each descriptor including (i) an identifier of a respective LSE described by that descriptor and (ii) a fullness indicator that indicates a level of fullness with valid data of the respective LSE identified by that descriptor;
(c) in response to detecting that evicting the second descriptor to the second cache causes the second cache to become full, flushing the second cache to a set of index structures by:
(1) dividing the plurality of descriptors in the second cache into a plurality of utilization bins, each utilization bin being assigned descriptors having fullness indicators within a respective non-overlapping range of fullness values; and (2) for each utilization bin of the plurality of utilization bins, storing, outside of the first cache and the second cache, an index structure that identifies all LSEs described by descriptors that are assigned to that utilization bin;

(d) repeating step c with new index structures of the set of index structures whenever the second cache becomes full, the set of index structures being arranged as a plurality of lists of index structures, one list per utilization bin, the index structures of each list being arranged in order from newest to oldest; and (e) performing data reorganization on LSEs identified by the index structures of the set of index structures such that the data reorganization is performed on LSEs of older index structures within each list prior to newer index structures within that list.

2. The method of claim 1 wherein storing each index structure includes generating and storing a storage-efficient model that maps a set of keys to a set of LSE identifiers of LSEs identified by that index structure.

3. The method of claim 2, wherein storing each index structure includes storing the storage-efficient model within the system memory; and wherein the storage-efficient models of the set of index structures are all stored within a portion of the system memory, the portion being smaller than 1 gigabyte, the log-structured storage system configured to manage at least 1 petabyte of storage, and the set of index structures collectively identifying over 500 million unique LSEs.

4. The method of claim 2 wherein generating each storage-efficient model includes creating a multi-stage storage-efficient model that monotonically maps the set of keys to the set of LSE identifiers identified by that index structure.

5. The method of claim 4 wherein creating each multi-stage storage-efficient model includes applying machine learning to generate that multi-stage storage-efficient model.

6. The method of claim 4, wherein the identifiers of LSEs numerically identify LSEs arranged in consecutively-numbered order; and wherein performing data reorganization on LSEs identified by the index structures includes locating the plurality of LSEs identified by an oldest index structure of one list of the set of index structures by, for each key of the set of keys of the multi-stage storage-efficient model of the oldest index structure:

loading into system memory, from the persistent storage, a plurality of LSE description elements of consecutively-numbered LSEs based on an LSE identifier approximation output by the multi-stage storage-efficient model of the oldest index structure, the plurality of LSE description elements encompassing a range defined by the multi-stage storage-efficient model around the LSE identifier approximation, the plurality of LSE description elements including all LSE description elements that are stored within a single data block of the persistent storage, each LSE description element including (1) a timestamp indicating a last time when a respective LSE described by that LSE description element was modified and (2) a fullness indicator; and locating a particular LSE associated with that key by selecting a particular LSE description element from the plurality of LSE description elements that includes both a timestamp within a time range associated with that index structure and a fullness indicator within a fullness range associated with that index structure.

7. The method of claim 2 wherein the method further comprises:

receiving an instruction to delete data stored within an LSE identified by an index structure of the set of index structures; and in response to receiving the instruction:

invalidating the data to be deleted within the LSE and inserting into the first cache an updated descriptor that identifies the LSE, the updated descriptor including a respective fullness indicator that indicates a current level of fullness of the LSE with valid data after the invalidation of the data; and adding an identifier of the LSE to an exception list of the index structure that identified the LSE, the exception list of the index structure indicating which LSEs identified by that index structure are no longer be considered to be identified by that index structure.

8. The method of claim 7 wherein the method further comprises:

receiving another instruction to delete other data stored within another LSE identified by the index structure; and in response to receiving the other instruction:

invalidating the other data to be deleted within the other LSE and inserting into the first cache another updated descriptor that identifies the other LSE, the other updated descriptor including another respective fullness indicator that indicates a current level of fullness of the other LSE with valid data after the invalidation of the other data;

adding another identifier of the other LSE to the exception list of the index structure; and in response to determining that the exception list of the index structure has reached a maximum size threshold as a result of adding the other identifier, regenerating the storage-efficient model for the index structure based on LSE identifiers of the index structure that are not on the exception list of the index structure.

9. The method of claim 1 wherein performing the data reorganization on LSEs identified by the index structures includes performing a consolidation operation as the data reorganization on the LSEs identified, wherein performing the consolidation operation includes:

combining valid data from the identified LSEs into free LSEs;

inserting into the first cache new descriptors that respectively identify the free LSEs, the new descriptors including fullness indicators that indicate full utilization; and freeing the identified LSEs for reuse.

10. The method of claim 9 wherein performing the data reorganization on LSEs identified by the index structures further includes performing a down-tiering operation, the down-tiering operation moving data from the identified LSEs into new LSEs drawn from lower-tier persistent storage.

11. The method of claim 1, wherein storing each index structure includes storing the storage-efficient model within the persistent storage; and wherein performing data reorganization on LSEs identified by the index structures of the set of index structures such that the data reorganization is performed on LSEs of older index structures within each list prior to newer index structures within that list includes loading an oldest index structure of each list of the plurality of lists from the data storage into system memory prior to performing the data reorganization on the LSEs that they identify.

12. A computerized apparatus for managing data storage resources in a log-structured storage system, the computerized apparatus comprising:
   network interface circuitry for connecting to a network;
   persistent storage that stores the log-structured storage system, the log-structured storage system storing newly-written data within log storage extents (LSEs), each LSE being a contiguously-addressable extent of the persistent storage; and
   processing circuitry coupled to memory configured to:
   (a) fulfill write requests received via the network interface circuitry by storing the newly-written data in free LSEs of the persistent storage and storing respective descriptors of those LSEs within a first cache within the memory;
   (b) in response to detecting that storing, within the first cache, a first descriptor of a first LSE causes the first cache to overflow, evict a second descriptor of a second LSE from the first cache to a second cache within the memory based on an age eviction policy, the first cache and the second cache each configured to store a respective plurality of descriptors, each descriptor including (i) an identifier of a respective LSE described by that descriptor and (ii) a fullness indicator that indicates a level of fullness with valid data of the respective LSE identified by that descriptor;
   (c) in response to detecting that evicting the second descriptor to the second cache causes the second cache to become full, flush the second cache to a set of index structures by:
      (1) dividing the plurality of descriptors in the second cache into a plurality of utilization bins, each utilization bin being assigned descriptors having fullness indicators within a respective non-overlapping range of fullness values; and
      (2) for each utilization bin of the plurality of utilization bins, storing, outside of the first cache and the second cache, an index structure that identifies all LSEs described by descriptors that are assigned to that utilization bin;
   (d) repeat step c with new index structures of the set of index structures whenever the second cache becomes full, the set of index structures being arranged as a plurality of lists of index structures, one list per utilization bin, the index structures of each list being arranged in order from newest to oldest; and
   (e) perform data reorganization on LSEs identified by the index structures of the set of index structures such that the data reorganization is performed on LSEs of older index structures within each list prior to newer index structures within that list.

13. The computerized apparatus of claim 12 wherein storing each index structure includes generating and storing a storage-efficient model that maps a set of keys to a set of LSE identifiers of LSEs identified by that index structure.

14. The computerized apparatus of claim 13,
   wherein storing each index structure includes storing the storage-efficient model within the memory; and
   wherein the storage-efficient models of the set of index structures are all stored within a portion of the memory, the portion being smaller than 1 gigabyte, the log-structured storage system configured to manage at least 1 petabyte of storage, and the set of index structures collectively identifying over 500 million unique LSEs.

15. The computerized apparatus of claim 12,
   wherein storing each index structure includes storing the storage-efficient model within the persistent storage; and
   wherein performing data reorganization on LSEs identified by the index structures of the set of index structures such that the data reorganization is performed on LSEs of older index structures within each list prior to newer index structures within that list includes loading an oldest index structure of each list of the plurality of lists from the data storage into system memory prior to performing the data reorganization on the LSEs that they identify.

16. A computer program product comprising a non-transitory computer-readable storage medium storing instructions, which when executed by a computerized data storage system cause the computerized data storage system to manage data storage resources in a log-structured storage system, the log-structured storage system storing newly-written data within log storage extents (LSEs), each LSE being a contiguously-addressable extent of persistent storage, by:
   (a) fulfilling write requests by storing the newly-written data in free LSEs and storing respective descriptors of those LSEs within a first cache within system memory of the computerized data storage system;
   (b) in response to detecting that storing, within the first cache, a first descriptor of a first LSE causes the first cache to overflow, evicting a second descriptor of a second LSE from the first cache to a second cache within the system memory based on an age eviction policy, the first cache and the second cache each configured to store a respective plurality of descriptors, each descriptor including (i) an identifier of a respective LSE described by that descriptor and (ii) a fullness indicator that indicates a level of fullness with valid data of the respective LSE identified by that descriptor;
   (c) in response to detecting that evicting the second descriptor to the second cache causes the second cache to become full, flushing the second cache to a set of index structures by:
      (1) dividing the plurality of descriptors in the second cache into a plurality of utilization bins, each utilization bin being assigned descriptors having fullness indicators within a respective non-overlapping range of fullness values; and
      (2) for each utilization bin of the plurality of utilization bins, storing, outside of the first cache and the second cache, an index structure that identifies all LSEs described by descriptors that are assigned to that utilization bin;
   (d) repeating step c with new index structures of the set of index structures whenever the second cache becomes full, the set of index structures being arranged as a plurality of lists of index structures, one list per utilization bin, the index structures of each list being arranged in order from newest to oldest; and
   (e) performing data reorganization on LSEs identified by the index structures of the set of index structures such that the data reorganization is performed on LSEs of older index structures within each list prior to newer index structures within that list.

* * * * *